United States Patent
Nishi et al.

(10) Patent No.: US 6,314,005 B1
(45) Date of Patent: Nov. 6, 2001

(54) DC-DC CONVERTER WHICH COMPENSATES FOR LOAD VARIATIONS

(75) Inventors: Koji Nishi, Kyoto; Koji Kitamura, Nagaokakyo; Hitoshi Tsuji, Sagamihara; Takayoshi Nishiyama, Yokohama; Yoshihiro Matsumoto, Sagamihara; Tadahiko Matsumoto, Yokohama, all of (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 09/392,998

(22) Filed: Sep. 9, 1999

(30) Foreign Application Priority Data

Sep. 16, 1998 (JP) .................................................. 10-280515
Jul. 1, 1999 (JP) .................................................. 11-187305

(51) Int. Cl.[7] .................................................. H02M 3/335
(52) U.S. Cl. .................................................. 363/21.08; 363/21.11
(58) Field of Search .................................................. 363/19, 20, 95, 363/97, 131, 21.08, 21.11; 323/266, 907

(56) References Cited

U.S. PATENT DOCUMENTS 5,717,578 * 2/1998 Afzal ....................................... 363/21
5,831,837 * 11/1998 Coyne et al. ........................... 363/21

* cited by examiner

*Primary Examiner*—Peter S. Wong
*Assistant Examiner*—Gary L. Laxton
(74) *Attorney, Agent, or Firm*—Ostrolenk, Faber, Gerb & Soffen, LLP

(57) ABSTRACT

A DC-DC converter includes a primary side circuit for allowing a switching device to perform on/off operations to output energy in a primary coil of a transformer to a secondary coil. A secondary side circuit rectifies and smooths a voltage outputted from the secondary coil so as to output a DC-DC voltage. A voltage-detecting circuit rectifies and smooths a voltage outputted from a voltage-detecting coil provided in the transformer so as to output the voltage as a detected voltage corresponding to a voltage to be outputted from the secondary side circuit. A control circuit applies to the switching device a pulse control signal used for controlling on/off operation of the switching device according to the voltage outputted from the voltage-detecting circuit. A primary side current-detecting circuit converts a working current in the primary side circuit, the working current corresponding to a current in the secondary side circuit, for performing detection thereof, and for superposing the thus detected voltage corresponding to the working current with the detected voltage outputted from the voltage-detecting circuit so as to compensate for an amount of variation of an output voltage of the secondary side circuit. The variation is attributed to a variation of the working current in the secondary side circuit. A voltage determined by the superposed voltage is applied to the control circuit.

18 Claims, 8 Drawing Sheets

CRITICAL POINT OF WORKING CURRENT
IN CHOKE COIL 16

DC-DC CONVERTER WHICH COMPENSATES FOR LOAD VARIATIONS

BACKGROUND OF THE INVENTION

1. Field of the Invention

The present invention relates to a DC-DC converter to be provided in apparatus such as a switching power-supply switching device.

2. Description of the Related Art

FIG. 13 shows an example of a DC-DC converter. As shown in the drawing, the DC-DC converter is an isolated forward converter having a transformer 1. The transformer 1 has a primary coil N1, a secondary coil N2, and voltage-detecting coil N3. A primary side circuit 3 having a switching device Q and a capacitor 2 is connected to the primary coil N1. An input power supply 4 is connected to the primary side circuit 3.

Also, a secondary side circuit 5 is connected to the aforementioned secondary coil N2, and an output side of the secondary side circuit 5 is connected to a load 6. In addition, a voltage-detecting circuit 8 is connected to the voltage-detecting coil N3. An output side of the voltage-detecting circuit 8 is connected to a control circuit 10. An output of the control circuit 10 is connected to the switching device Q of the primary side circuit 3.

The primary side circuit 3 has a configuration in which power is sent from the input power supply 4 to the secondary side circuit 5 via the transformer 1. The secondary side circuit 5 rectifies and smoothes voltage from the secondary coil N2, and a DC voltage $V_{out}$ rectified and smoothed thereby is outputted to the load 6.

Also, the voltage-detecting circuit 8 has a configuration that rectifies and smoothes voltage from the voltage-detecting coil N3. A voltage corresponding to a voltage from the aforementioned secondary coil N2 is generated, and the voltage from the secondary coil N2 is processed as a voltage corresponding to an output voltage $V_{out}$ of the aforementioned secondary side circuit 5. Accordingly, the voltage-detecting circuit 8 has a configuration that outputs the aforementioned voltage rectified and smoothed into the control circuit 10 as the output voltage $V_{out}$ of the secondary side circuit 5.

In addition, according to a detected voltage applied by the voltage-detecting circuit 8, the control circuit 10 has a configuration that applies a pulse control signal to the switching device Q, the pulse control signal functioning to stabilize the output voltage $V_{out}$ of the secondary side circuit 5, as shown in FIG. 12. The pulse control signal controls on/off operations of the switching device Q, and the switching device Q performs on/off operations according to the pulse control signal.

As described above, in the DC-DC converter shown in FIG. 13, a voltage corresponding to the output voltage $V_{out}$ of the secondary side circuit 5 is generated in the voltage-detecting coil N3. This allows the voltage-detecting circuit 8 to use the voltage in the voltage-detecting coil N3 and to indirectly detect and output the output voltage $V_{out}$ of the secondary side circuit 5. By circuit operations of the control circuit 10 according to the detected voltage, on/off operations of the switching device Q are controlled, and the output voltage $V_{out}$ of the secondary side circuit 5 is stabilized.

In the foregoing DC-DC converter in which the output voltage $V_{out}$ of the secondary side circuit 5 is indirectly detected, problems occur because output voltage $V_{out}$ varies according to load variation and this variation is not reflected in the voltage detected by voltage detecting circuit 8.

That is, when load variation occurs, currents $I_{out}$ to be outputted to the load 6 vary according to the load variation. This current variation causes the output voltage $V_{out}$ to also vary. On the other hand, no variation occurs in a voltage applied from the voltage-detecting circuit 8 to the control circuit 10 and the control circuit 10 does not compensate for the variations in the output voltage $V_{out}$ attributable to the variations in load 6.

In other words, in the circuit configuration as shown in FIG. 13, the relationship between the current $I_{out}$ and the output voltage $V_{out}$, as shown in FIG. 11, is produced, and the output voltage $V_{out}$ varies according to variation of the current $I_{out}$ caused by variations in the load 6. This load-variation-attributed variation of the output voltage $V_{out}$ cannot be detected by the voltage-detecting coil N3. Therefore, in the control circuit 10, circuit operations for compensating the variation of the output voltage $V_{out}$ do not occur. This produces problems in that the voltage $V_{out}$ varies according to the load variation, and therefore, the output voltage $V_{out}$ is not stabilized satisfactorily.

The following problems also arise in a DC-DC converter of a type in FIG. 13, in which the output voltage $V_{out}$ of the secondary side circuit 5 is indirectly detected. When environmental variations occur for the DC-DC converter, characteristics of components of the individual circuits vary according to variation of the temperature therein, resulting in variation of the output voltage $V_{out}$ of the secondary side circuit 5. This causes problems in that variation of the output voltage $V_{out}$ due to temperature-variation cannot be prevented.

These problems are caused by the following reasons. As in the case where the aforementioned load variation occurs, when the output voltage $V_{out}$ varies according to environmental temperature variations, the variation of the output voltage $V_{out}$ cannot be detected using the voltage-detecting coil N3. In addition, the detected voltage outputted from the voltage-detecting circuit 8 to the control circuit 10 also varies according to the aforementioned environmental temperature variation without regard to the output voltage $V_{out}$. Since on/off operations of the switching device Q are controlled by circuit operations of the control circuit 10 according to the detected voltage, problems arises in that the output voltage $V_{out}$ of the secondary side circuit 5 is very unstable because of the temperature variation.

SUMMARY OF THE INVENTION

The present invention can solve the aforementioned problems by providing a DC-DC converter that can suppress the variation of the output voltage of the secondary side circuit which is attributed to the load variation and the environmental temperature variation so as to stabilize the output voltage of the secondary side circuit.

In order to achieve the above objects, the present invention has the following configurations for solving the problems as described above. That is, a first aspect of the invention for solving the above problems provides a DC-DC converter having a primary side circuit including a switching device for performing on/off operations to output energy in a primary coil of a transformer to a secondary coil, a secondary side circuit for rectifying and smoothing a voltage outputted from the secondary coil so as to output a DC-DC voltage, a voltage-detecting circuit for rectifying and smoothing a voltage outputted from a voltage-detecting coil provided in the transformer so as to output the voltage as a detected voltage corresponding to a voltage to be outputted from the secondary side circuit, and a control circuit for applying to the switching device a pulse control signal used for controlling on/off operation of the switching device according to the voltage outputted from the voltage-detecting circuit, in which a primary side current-detecting circuit is provided for converting a working current in the primary side circuit, the working current corresponding to a current in the secondary side circuit, for performing detection thereof, for overlapping the detected voltage with the voltage outputted from the voltage-detecting circuit so as to compensate for the amount of variation of the output voltage of the secondary side circuit, the variation being attributed to a variation of the working current in the secondary side circuit, and for applying a voltage according to the overlapped voltage to the control circuit.

To solve the aforementioned problems, a second aspect of the invention provides that the control circuit has a configuration in which a pulse control signal having an off-time $T_{off}$ which is equivalent to at least the half-cycle $T_r$ of an LC resonance in the primary side circuit is applied to the switching device.

A third aspect of the invention provides a temperature-compensating circuit for adding to the output voltage of the voltage-detecting circuit a voltage for offsetting the amount of temperature-variation-attributed variation of the output voltage of the secondary side circuit is provided.

A fourth aspect of the invention has a configuration characterized in that the number of windings of the secondary coil of the transformer is the same as the number of windings of the voltage-detecting coil.

A fifth aspect of the invention has a configuration characterized in that an overcurrent-protecting circuit is provided for performing overcurrent-protecting operations according to the working current in the primary side circuit which has been detected by the primary side current-detecting circuit.

A sixth aspect of the invention has a configuration characterized in that the primary side current-detecting circuit is comprised of a resistor provided on a working-current path of the primary side circuit.

In the present invention having the above configuration, the primary side current-detecting circuit converts a working current to a voltage, performs detection thereof, and superposed the detected voltage with an output voltage of the voltage-detecting circuit. A voltage corresponding to the detected voltage is then applied to the control circuit. When a working voltage varies according to a load variation, the working current in the primary side circuit varies according to the current variation. Therefore, the aforementioned primary side current-detecting circuit detects and outputs a voltage corresponding to the variation of the working current in the aforementioned primary side current-detecting circuit. In other words, the primary side current-detecting circuit detects and outputs a voltage corresponding to the amount of load-variation-attributed variation of an output voltage of the secondary side circuit.

The detected voltage is superposed with the output voltage of the voltage-detecting circuit, and a voltage corresponding to the superposed voltage is applied to the control circuit. Therefore, the voltage applied from a side of the voltage-detecting circuit to the control circuit varies according to the load-variation-attributed variation of the output voltage of the secondary side circuit. Accordingly, the circuit operation of the control circuit allows compensation for load-variation-attributed variation of the output voltage of the secondary side circuit, thereby allowing stabilization of the output voltage of the secondary side circuit to be achieved.

Also, in the configuration having the temperature-compensating circuit, the temperature-compensating circuit applies a voltage for compensating the amount of temperature-variation-attributed variation of an output voltage of the secondary side circuit which is added to an output voltage of the voltage-detecting circuit so as to perform temperature compensation. Accordingly, the circuit operation of the control circuit allows stabilization of the output voltage of the secondary side circuit without being affected by adverse effects of environmental temperature variation.

As described above, even in a configuration that employs a method in which the voltage-detecting coil of the transformer is used to indirectly detect an output voltage of the secondary side circuit, the circuit operation of the control circuit allows compensation for the load-variation-attributed and environmental-temperature-variation-attributed variations of the output voltage of the secondary side circuit. Accordingly, stabilization of the output voltage of the secondary side circuit can be achieved even when the load and temperature vary. In this way, stability of the output voltage of the secondary side circuit can be improved significantly, and therefore, the aforementioned problems can be solved.

For the purpose of illustrating the invention, there is shown in the drawings several forms which are presently preferred, it being understood, however, that the invention is not limited to the precise arrangements and instrumentalities shown.

BRIEF DESCRIPTION OF THE DRAWING(S)

DETAILED DESCRIPTION OF EMBODIMENTS OF THE INVENTION

Hereinafter, a description will be given of embodiments of the present invention with reference to the drawings.

Figure 1:
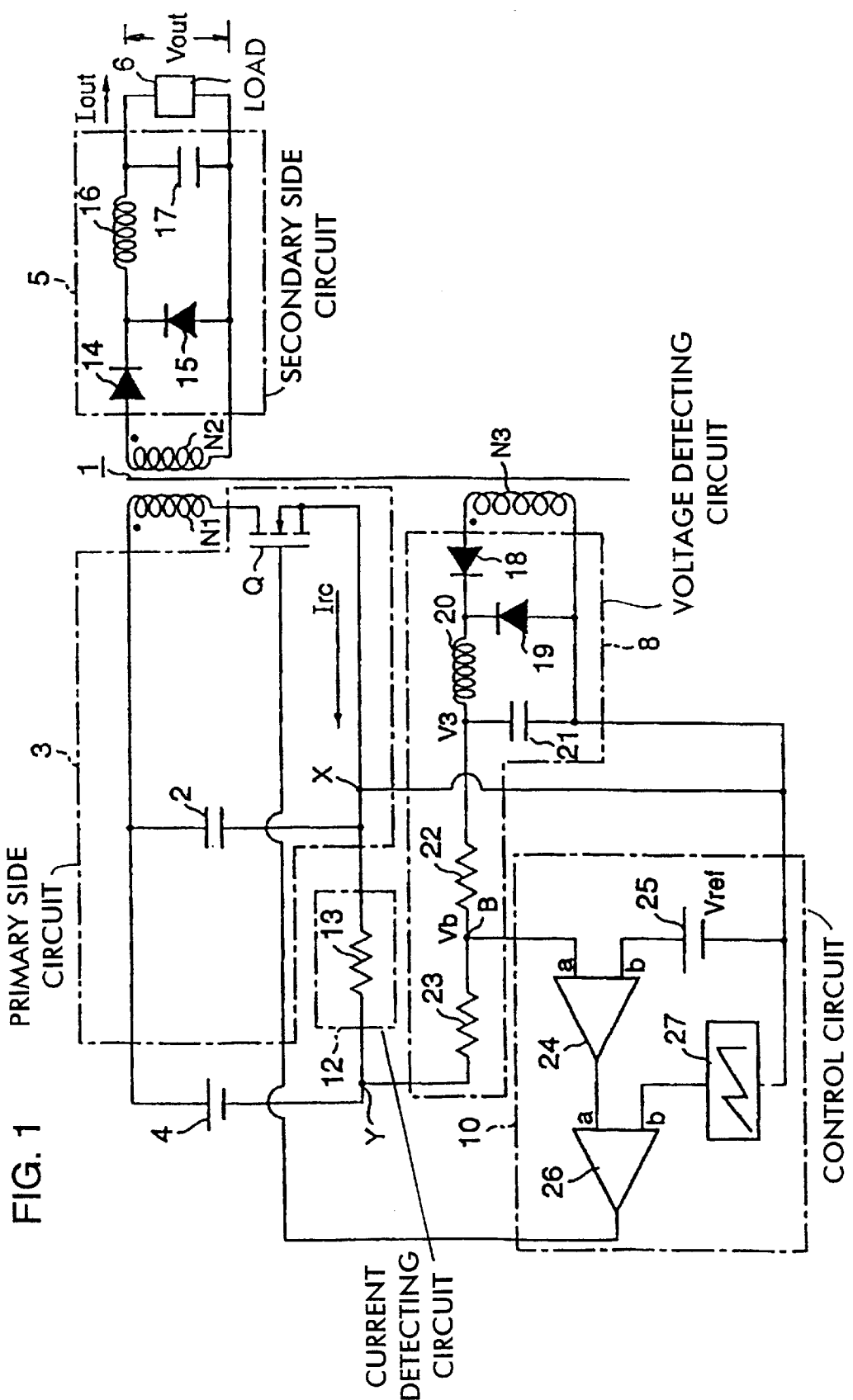
FIG. 1 is a circuit diagram of a DC-DC converter according to a first embodiment of the present invention.

FIG. 1 shows a first embodiment of a DC-DC converter according to the present invention. In a description of the first embodiment, the same symbols or numbers are used for configuration portions which are identical to those of the DC-DC converter in FIG. 13, and a detailed description of the common portions is omitted.

Figure 13:
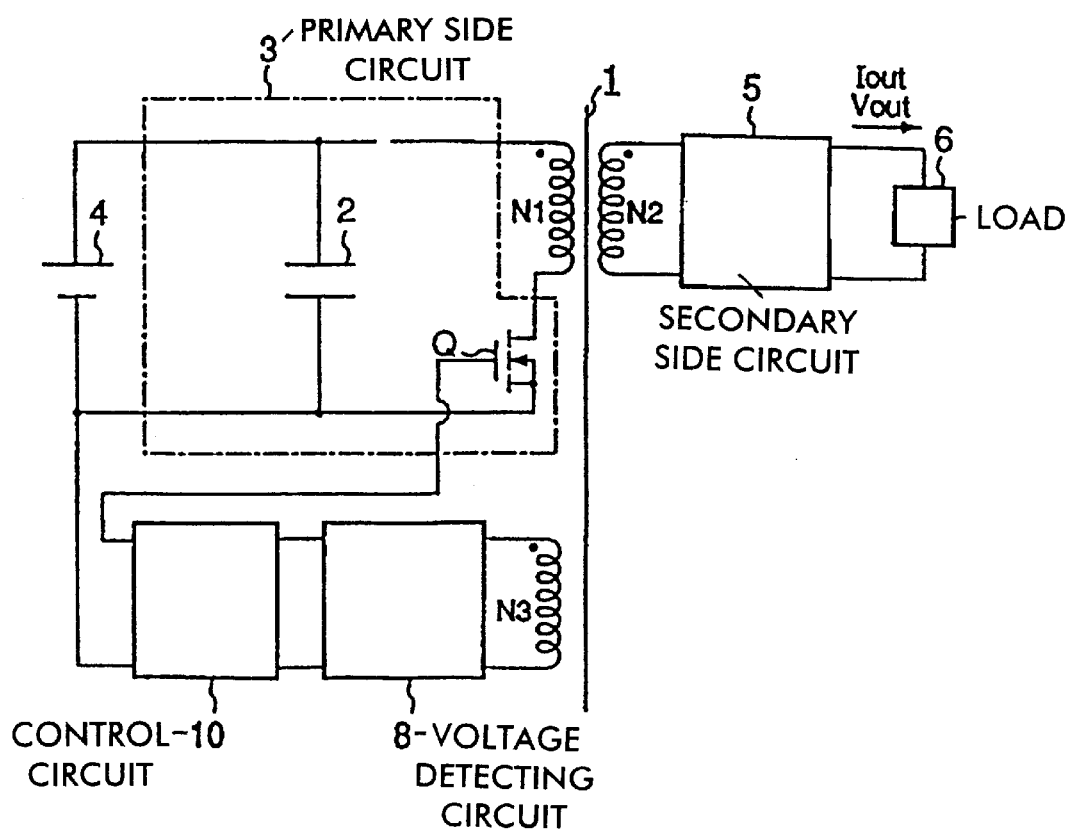
FIG. 13 is a circuit diagram of a conventional circuit.

As shown in FIG. 1, the first embodiment is characterized in that a primary side current-detecting circuit 12 is provided in addition to the configuration in FIG. 13. The primary side current-detecting circuit 12 allows compensation for a variation of an output voltage $V_{out}$, the variation being attributed to a variation of a working current in the secondary side circuit 5.

Figure 11:
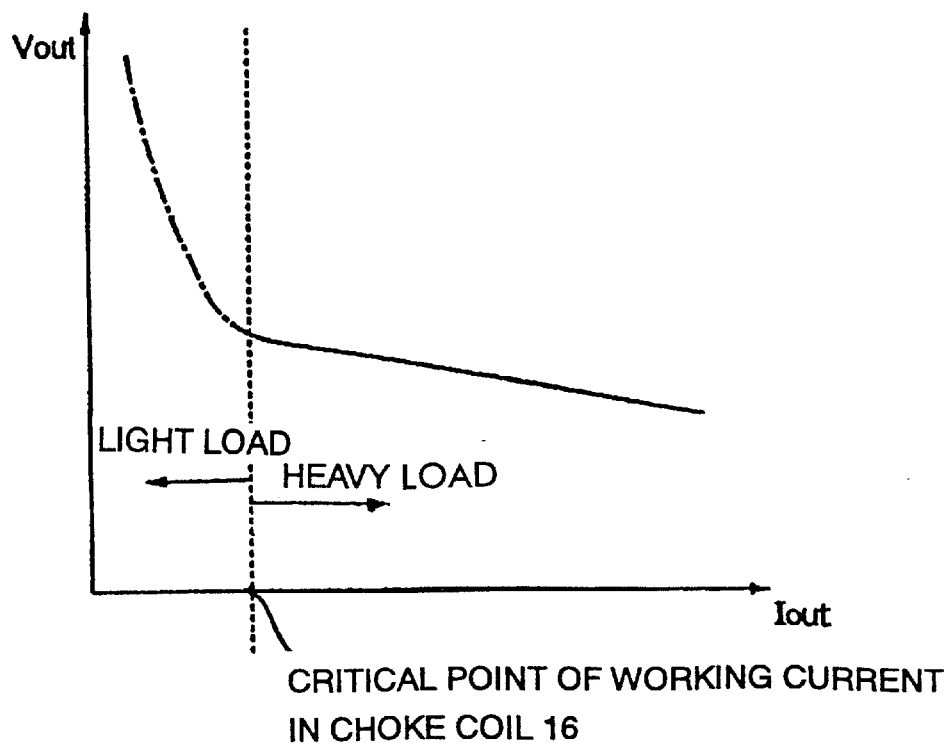
FIG. 11 is a graph showing an example of the relationship of a current $I_{out}$ to be outputted to a load and the output voltage $V_{out}$.
Figure 12:
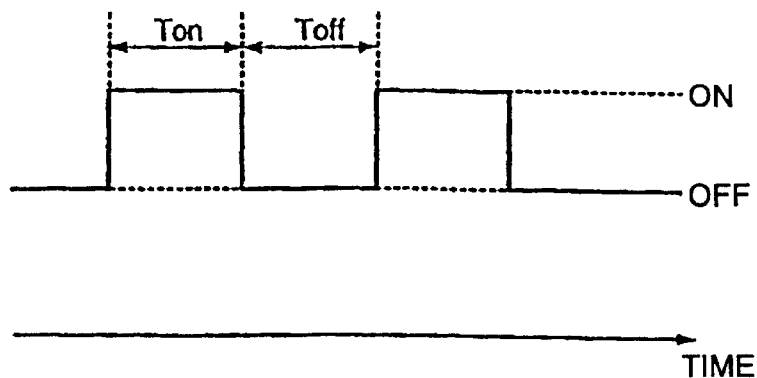
FIG. 12 is a waveform chart of an example pulse control signal.

Also, during a light load application, a current in a choke circuit is changed to be in a discontinuous mode and the variation of the output voltage $V_{out}$, which corresponds to a current $I_{out}$, increases significantly. The dividing point between light load and heavy load application is indicated by single-dotted chain lines in FIG. 11. The first embodiment has also a configuration that can compensate for the light load-attributed variations of the output voltage $V_{out}$. This configuration also characterizes the first embodiment.

Specifically, as shown in FIG. 1, a drain side of a switching device Q (MOS-FET in the example shown in FIG. 1) is connected to one end side of a transformer 1 of a primary coil N1, and one end side of a capacitor 2 is connected to the other end of the primary coil N1. The other end of the capacitor 2 is connected to a source side of the aforementioned switching device Q. One end side of a resistor 13 is connected to a connection section X of the capacitor 2 and the source side of the switching device Q, and the other end of the resistor 13 is connected to a negative pole side of a DC-current input power supply 4. A positive pole side of the input power supply 4 is connected to a connection section of the aforementioned capacitor 2 and primary coil N1.

An anode side of a rectifying diode 14 is connected to one end side of a secondary coil N2. A cathode side of a rectifying diode 15 is connected to a cathode side of the rectifying diode 14, and an anode side of the rectifying diode 15 is connected to the other end of the secondary coil N2. One end side of a choke coil 16 is connected to a connection section of the cathodes of the aforementioned rectifying diodes 14 and 15, the other end side of the choke coil 16 is connected to one end side of a smoothing capacitor 17. The other end side of the smoothing capacitor 17 is connected to a connection section of the aforementioned secondary coil N2 and the anode side of the rectifying diode 15, and a load 6 is connected to the aforementioned smoothing capacitor 17 in parallel.

Also, an anode side of a rectifying diode 18 is connected to one end side of a voltage-detecting coil N3, and a cathode side of a rectifying diode 19 is connected to a cathode side of the rectifying diode 18. An anode side of the rectifying diode 19 is connected to the other end side of the aforementioned voltage-detecting coil N3. One end side of a choke coil 20 is connected to a connection section of cathodes of the aforementioned rectifying diodes 18 and 19.

The other end side of the choke coil 20 is connected to one end side of a smoothing capacitor 21, and the other end side of the smoothing capacitor 21 is connected to a connection section of the voltage-detecting coil N3 and the anode side of the rectifying diode 19.

One end side of a resistor 22 is connected to a connection section of the aforementioned choke coil 20 and smoothing capacitor 21. One end side of a resistor 23 is connected to the other end side of the resistor 22, and the other end side of the resistor 23 is connected to a connection section Y to the negative pole side of the aforementioned input power supply 4 and the resistor 13.

A connection point "B" of the aforementioned resistor 22 and resistor 23 is connected to an input terminal "a" of an error amplifier 24, and a positive pole side of a DC reference power supply 25 is connected to an input terminal "b" of the error amplifier 24. A negative pole side of the reference power supply 25 is connected to a ground side of the aforementioned smoothing capacitor 21, and a connection point of the negative pole side of the reference power supply 25 and the smoothing capacitor 21 is connected to the connection point X of the aforementioned smoothing capacitor 21 and resistor 13.

An output terminal of the aforementioned error amplifier 24 is connected to an input terminal "a" of a comparator 26, and a triangular-wave generating circuit 27 is connected to an input terminal of the comparator 26. An output terminal of the comparator 26 is connected to a gate side of the aforementioned switching device Q.

The aforementioned capacitor 2 and switching device Q constitute a primary side circuit 3. The aforementioned rectifying diodes 14 and 15, the choke coil 16, and the smoothing capacitor 17 constitute the secondary side circuit 5. The aforementioned rectifying diodes 18 and 19, the choke coil 20, the smoothing capacitor 21, and the resistors 22 and 23 constitute the voltage-detecting circuit 8. The above resistor 13 forms the primary side current-detecting circuit 12. The aforementioned error amplifier 24, reference power supply 25, comparator 26, and triangular-wave generating circuit 27 constitute a control circuit 10.

The aforementioned control circuit 10 has a configuration in which circuit constants of the configuration components of the control circuit, such as the error amplifier 24, are predetermined. This allows addition of a pulse control signal having an off-time $T_{off}$ which is equivalent to at least a half-cycle $T_r$ of an LC resonance in the primary side circuit 3 to the switching device Q.

Figure 2:
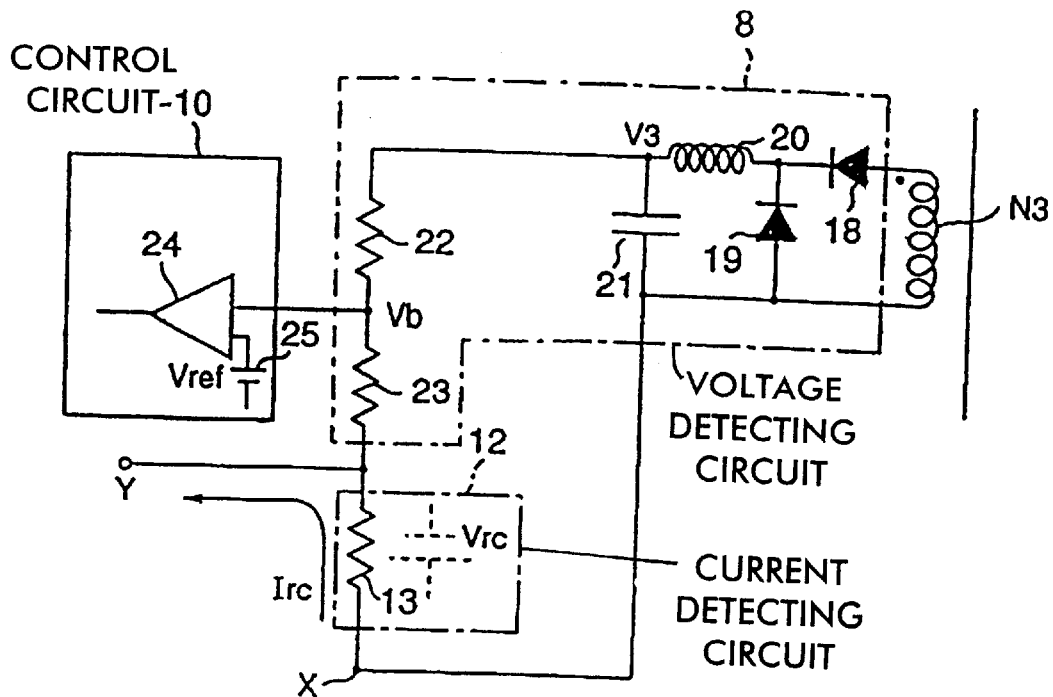
FIG. 2 is a circuit diagram for explaining a unique operation of a primary side current-detecting circuit of the DC-DC converter shown in FIG. 1.

The first embodiment of the DC-DC converter is configured as described above. Hereinbelow, with reference to FIGS. 1 and 2, a description will be given of circuit operation which is most characteristic in this embodiment. FIG. 2 is a view selectively showing circuit configuration portions of the DC-DC converter in FIG. 1, which are most characteristic.

As shown in FIGS. 1 and 2, a reflected load current $I_{rc}$ flowing in the primary side circuit 3 flows through the resistor 13 in the primary side current-detecting circuit 12. This current generates a voltage $V_{rc}$ (shown by dotted lines in FIG. 2) corresponding to the reflected load current $I_{rc}$.

A voltage in the voltage-detecting coil N3 is rectified and smoothed by the voltage-detecting circuit 8 to produce a voltage $V_c$ and which is applied to the smoothing capacitor 21. However, since the voltage $V_{rc}$ across resistor 13 reduces the voltage $V_c$, the net voltage across the smoothing capacitor 21 is a difference voltage V3, a result of subtraction of the voltage $V_{rc}$ of the voltage $V_c$ ($V3=V_c-V_{rc}$) The voltage V3 is divided by the resistor 22 and the resistor 23, and a divided voltage $V_b$ is applied to the control circuit 10.

Specifically, the voltage $V_{rc}$ across resistor 13 is subtracted from the voltage $V_c$ in the voltage-detecting circuit 8, thereby producing the difference voltage V3, and the aforementioned divided voltage $V_d$, corresponding to the difference voltage V3, is applied to the control circuit 10.

The reflected load current $I_{rc}$ in the primary side circuit 3 is proportional to the load current $I_{out}$ in the secondary side circuit 5. Therefore, the reflected load current in the secondary side circuit 5 increases according to variations in the 6 (and therfore the load current $I_{out}$) the voltage $V_{rc}$ across the resistor 13 increases accordingly. When the load current $I_{out}$ in the secondary side circuit 5 decreases as a function of a variation in the load 6 the reflected load current $I_{rc}$ decreases along with it as does the voltage $V_{rc}$ across the resistor 13.

As described above, when the reflected load voltage $V_{rc}$ across resistor 13 increases as a function of the increase of the load current $I_{out}$ in the secondary side circuit 5 which itself increased as a function of the load variation, a difference voltage V3 in the smoothing capacitor 21 decreases proportionally to the increase of the reflected load voltage $V_{rc}$. Accordingly the divided voltage $V_d$ (which operates as a control voltage for the control circuit 10) also decreases. That is, when the output voltage $V_{out}$ of the secondary side circuit 5 decreases as a function of variations in the load 6, the divided voltage $V_b$ applied to the control circuit 10 decreases by an amount corresponding to the reduction of the output voltage $V_{out}$. Therefore, the reduction of the output voltage $V_{out}$ according to the load variation is compensated for by circuit operation of the control circuit 10, which is performed according to divided voltage $V_b$.

Similarly, when the load current $I_{out}$ in the secondary side circuit 5 decreases and the output voltage $V_{out}$ of the secondary side circuit 5 increases as a function of variations in the load 6, the divisional voltage $V_b$ increases proportionally to the increase of the output voltage $V_{out}$. Therefore, the increase of the output voltage $V_{out}$ caused by load variation is compensated for by control circuit 10.

In the first embodiment resistor 13 is used to convert the reflected load current $I_{rc}$ in the primary side circuit 3 to a voltage, and detection thereof is performed. Then, the detected voltage $V_{rc}$ is superposed with the voltage $V_c$ which has been rectified and smoothed by the voltage-detecting circuit 8, and the divide voltage $V_b$ corresponding to the difference overlapped voltage V3 is applied to the control circuit 10. Since the first embodiment has the configuration as described above, the divide voltage $V_b$ to be applied to the control circuit 10 from the voltage-detecting circuit 8 varies according to the load-variation-attributed variation of the output voltage $V_{out}$. Accordingly, circuit operation of the control circuit 10 compensates for the load-variation-attributed variation of the output voltage $V_{out}$ of the secondary side circuit 5. That is, the load-variation-attributed variation of the output voltage $V_{out}$ is suppressed, and stability of the output voltage $V_{out}$ is improved.

Now, the output voltage $V_{out}$ of the secondary side circuit 5 is assumed to have been compensated for by a voltage $\Delta V_{out}$ by the provision of the resistor 13. In this case, the amount of compensation for the voltage $\Delta V_{out}$ can be expressed by the following expression (1):

$$\Delta V_{out}=(V_{out}\cdot V_{rc}/V_{ref})\cdot(1-(V_{ref}/V_c)) \tag{1}$$

In the above, $V_{out}$ represents an output voltage in the secondary side circuit 5 prior to compensation; $V_{rc}$ represents a voltage occurring with the resistor 13 in the primary side current-detecting circuit 12; and $V_{ref}$ represents a DC voltage of the reference power supply 25 of the error amplifier 24 in the control circuit 10. Also, $V_c$ represents a voltage of the voltage-detecting coil N3 which is rectified and smoothed (which is hereinafter called a "rectified and smoothed voltage").

The above expression (1) is derived as described below. When a voltage output from the secondary side circuit 5 is to be assumed to be the output voltage $V_{out}$, a rectified and smoothed voltage in the voltage-detecting coil N3 is to be assumed to be $V_c$. Also, the resistance value of the resistor 22 is to be assumed to be R22, and the resistance value of the resistor 23 is to be assumed to be R23. With these assumptions, when the aforementioned resistor 13 is not provided, the DC voltage $V_{ref}$ is determined to satisfy expression (2) below.

$$V_{ref}=V_c\cdot(R22/(R22+R23)) \tag{2}$$

In the circuit configuration in FIG. 1, the resistor 13 is provided. According to the provision of the resistor 13, the rectified and smoothed voltage $V_c$ in the aforementioned voltage-detecting coil N3 is assumed to have varied by a voltage $\Delta V_c$. At the same time, according to the variation of the voltage $V_c$, compared to a case where the resistor 13 is not provided, the output voltage $V_{out}$ in the secondary side circuit 5 is assumed to have been compensated for by the voltage $\Delta V_{out}$. With the assumption made in this way, the voltage $V_{rc}$ in the resistor 13 is overlapped with the rectified and the smoothed voltage $(V_c+\Delta V_c)$ in the voltage-detecting coil N3, and the superposed voltage is divided by the resistors 22 and 23 and applied to th e control circuit 10. Accordingly, when the resistor 13 is provided, the DC voltage $V_{ref}$ can be expressed by expression (3) below.

$$V_{ref}=-V_{rc}+((V_c+\Delta V_c)+V_{rc})\cdot(R22/(R22+R23)) \tag{3}$$

Also, when the number of windings of the secondary coil N2 is assumed to be N2, and the number of windings of the voltage-detecting coil N3 is assumed to be N3, the expression (4) below is obtained. Thus, according to the expressions (2) to (4), the expression (1) is derived, as indicated above.

$$N3/N2=V_c/V_{out}=\Delta V_c/\Delta V_{out} \tag{4}$$

In the first embodiment, to obtain a large amount of compensation voltage $\Delta V_{out}$ for the output voltage $V_{out}$, a resistance value $R_{rc}$ of the resistor 13, the number of windings of the voltage-detecting coil N3, and the like are determined according to the above expression (1).

Figure 3:
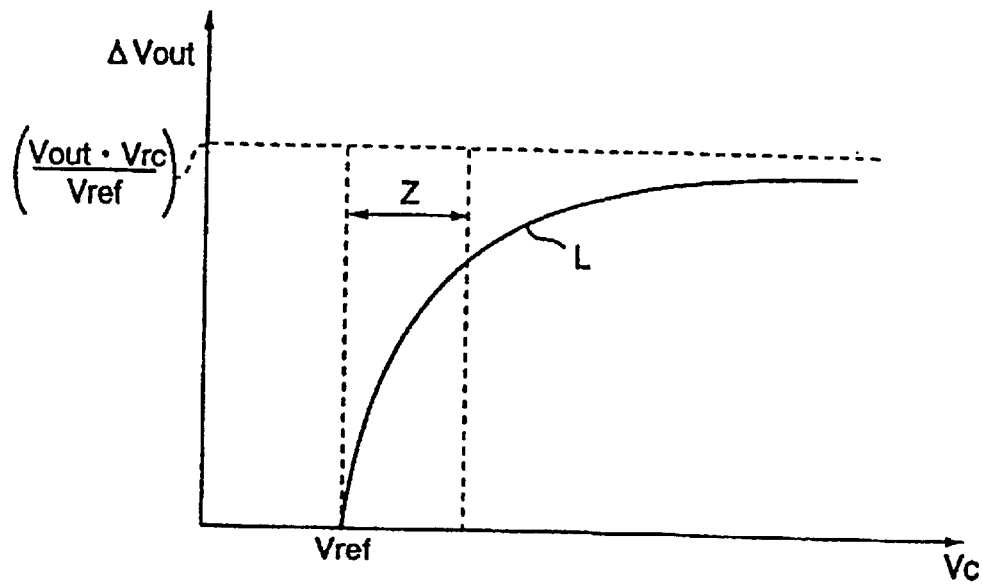
FIG. 3 is a graph showing the relationship between the amount $\Delta V_{out}$ of a load-variation-attributed variation of an output voltage of a secondary side circuit and an output voltage $V_c$ of a current-detecting circuit.

Specifically, according to the above expression (1), the relationship between the compensation amount $\Delta V_{out}$ of the output voltage $V_{out}$ of the secondary side circuit 5 and the variation amount $\Delta V_c$ of the rectified and smoothed voltage VC in the aforementioned voltage-detecting coil N3 can be graphed as shown in FIG. 3. As is apparent in FIG. 3, the aforementioned compensation amount $\Delta V_{out}$ can be increased by increasing the value of the voltage $V_c$ in a region where the slope angle of a continuous-line curve in FIG. 3 is large (for example, the region Z shown in FIG. 3). Therefore, the compensation is effective when the value of the voltage $V_c$ is increased in a region where the slope angle of a continuous-line curve in FIG. 3 is large (for example, the region Z shown in FIG. 3).

Also, values of $(V_{out}\cdot V_{rc}/V_{ref})$ shown in FIG. 3 can be increased by increasing the resistance value of the resistor 13 and by increasing the voltage $V_{rc}$ in the resistor 13, and thereby, the aforementioned compensation amount $\Delta V_{out}$ can be increased.

In the first embodiment as described above, the load-variation-attributed variation of the output voltage $V_{out}$ of the secondary side circuit 5 can be compensated for with high precision according to provision of the primary side current-detecting circuit 12 and selective determination of circuit constants in the voltage-detecting circuit 8 and the resistance value of the resistor 13, and the like. Accordingly, the significantly stabilized output voltage $V_{out}$ can be fed to the load 6.

As described above, the first embodiment has a configuration that has the aforementioned primary side current-detecting circuit 12, and in addition, the control circuit 10 by which the off-time $T_{off}$ of the switching device Q is controlled to be equivalent at least to the half-cycle $T_r$ of the LC resonance in the primary side circuit 3. This configuration allows suppression of a wide range of variation of the output voltage $V_{out}$ of the secondary side circuit 5 during a light load application, the dividing point between light and heavy load variations being shown by a single-dotted chain line in FIG. 11 for the reasons described below. That is, even during a light load application, the output voltage $V_{out}$ of the secondary side circuit 5 can be stabilized.

As in the first embodiment, the off-time $T_{off}$ of the switching device Q is equivalent at least to the half-cycle $T_r$ of the LC resonance in the primary side circuit 3. In this case, when, instead of a light load, a current in a continuous mode is flowing to the choke coil 16 in the secondary side circuit 5, a voltage represented by a waveform A in FIG. 4 occurs in the secondary coil N2. At this time, a voltage in hatched regions in the wave form A is rectified and smoothed by the secondary side circuit 5, and the voltage rectified and smoothed therein is output to the load 6 as the output voltage $V_{out}$.

Figure 4:
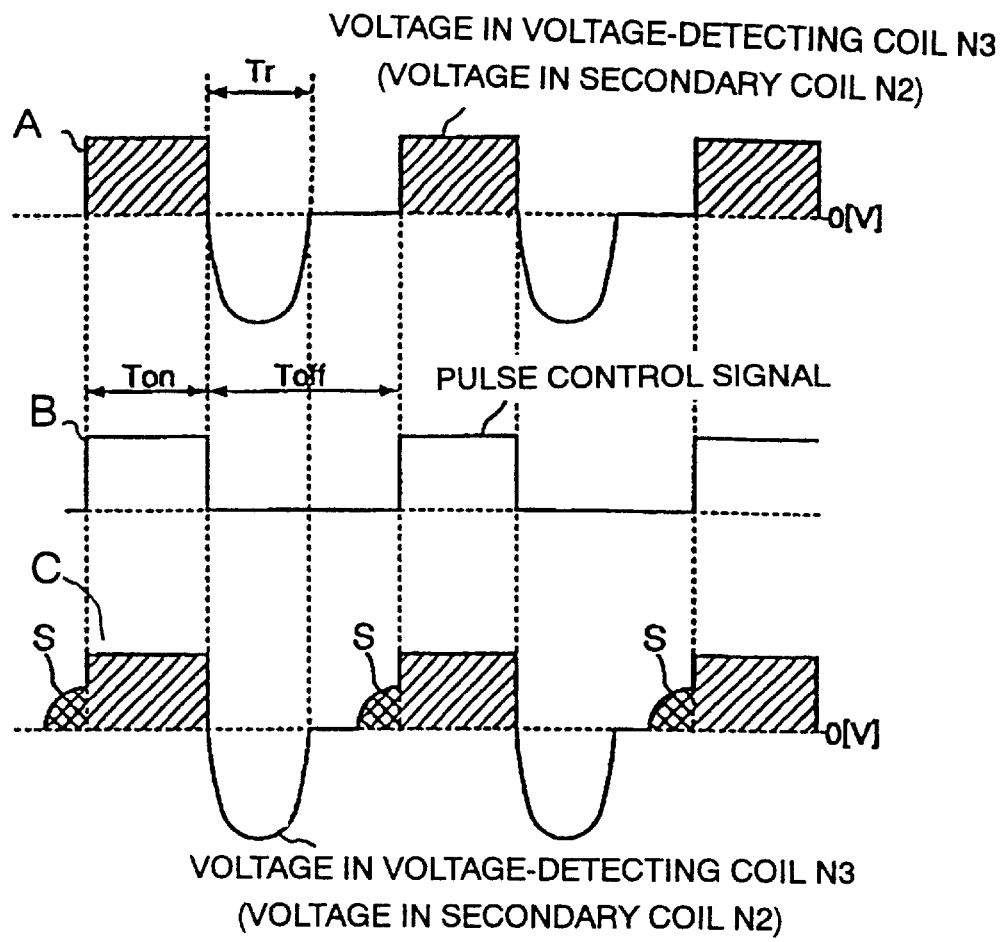
FIG. 4 is a waveform chart showing, with a pulse control signal, an example waveform of voltage in a voltage-detecting coil N3 when an off-time $T_{off}$ of a switching device Q is equivalent at least to a half-cycle $T_r$ of an LC resonance in a primary side circuit.

A voltage having a waveform A shown in FIG. 4 occurs in the voltage-detecting coil N3 also, and the voltage in the hatched regions in the waveform A is rectified and smoothed by the voltage-detecting circuit 8. A voltage according to the voltage rectified and smoothed therein is output to the control circuit 10, and according to the voltage, the control circuit 10 controls on/off operations of the switching device Q that functions to stabilize the output voltage $V_{out}$.

When operating on a light load, when a voltage in a discontinuous mode is flowing to the choke coil 16 in the secondary side circuit 5, a voltage represented by a waveform C in FIG. 4 occurs in the secondary coil N2. In the voltage waveform C, regions S increase even more, compared to the voltage waveform A in the continuous mode. In the increasing regions S, the output voltage $V_{out}$ of the secondary side circuit 5 increases significantly.

In this case, similarly to the earlier case, a voltage having the waveform C occurs in the voltage-detecting coil N3. This also significantly increases the voltage to be applied to the control circuit 10 from the voltage-detecting circuit 8. Accordingly, the control circuit 10 is enabled to control on/off operations of the switching device Q so as to reduce and compensate for the increase of the output voltage $V_{out}$. By this, the increase of the output voltage $V_{out}$ is compensated for, and therefore, stabilization of the output voltage $V_{out}$ can be achieved.

Figure 5:
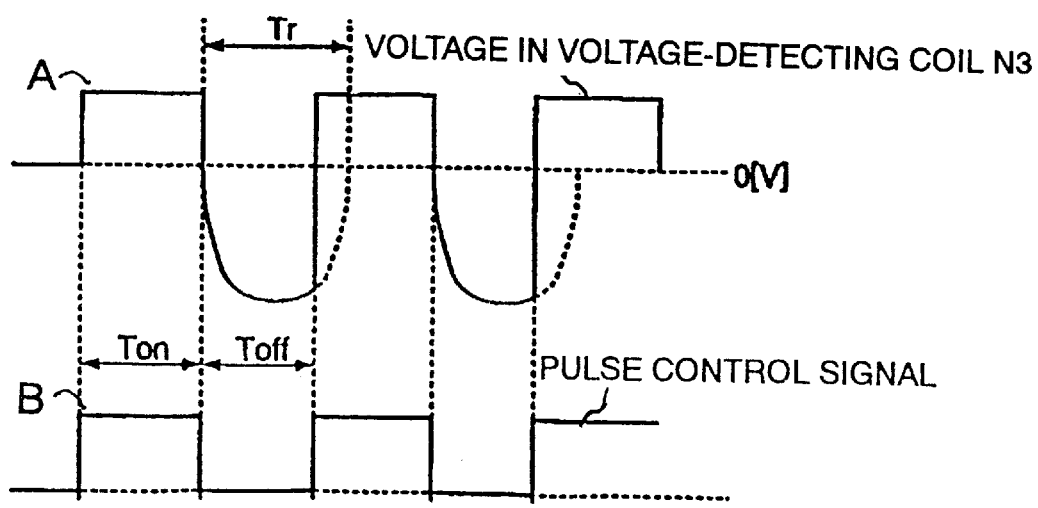
FIG. 5 is a waveform chart showing, with a pulse control signal, an example waveform of voltage in the voltage-detecting coil N3 when the off-time $T_{off}$ of the switching device Q is shorter than the half-cycle $T_r$ of the LC resonance in the primary side circuit.

In the voltage waveform in the aforementioned voltage-detecting coil N3, however, regions S, which are unique to a light load application, do not occur unless the off-time $T_{off}$ of the switching device Q is equivalent at least to the half-cycle $T_r$ of the LC resonance in the primary side circuit 3. That is, when the off-time $T_{off}$ of the switching device Q is shorter than the half-cycle $T_r$ of the LC resonance in the primary side circuit 3, the waveform of a voltage occurring in the voltage-detecting coil N3 during a light load application is as shown by a waveform A in FIG. 5.

As described above, during a light load application, when the off-time $T_{off}$ of the switching device Q is shorter than the half-cycle $T_r$ of the LC resonance in the aforementioned primary side circuit 3, regions S, as shown by the waveform C in FIG. 4, do not occur in the voltage-detecting coil N3. Therefore, during a light load application, a variation of an output voltage $V_{out}$ cannot be compensated for.

In contrast, as described above, the first embodiment has a configuration in which the off-time $T_{off}$ of the switching device Q is controlled to be equivalent at least to the half-cycle $T_r$ of the LC resonance in the primary side circuit 3. Therefore, during a light load application, a unique waveform having S regions, as shown at C in FIG. 4, occurs in the voltage-detecting coil N3. The aforementioned S regions allow the variation of the output voltage $V_{out}$ of the secondary side circuit 5 to be compensated for, and therefore, stability of the output voltage $V_{out}$ can be improved significantly.

Hereinbelow, a second embodiment is described. The second embodiment is characterized by having a configuration that compensates for a variation of the output voltage $V_{out}$ of a secondary side circuit 5, the variation being attributed to a variation in environmental temperatures surrounding the DC-DC converter. Except for the above, the configuration is the same as that of the first embodiment; therefore, in the second embodiment, the same symbols or numbers are used for portions identical to those of the first embodiment, and a duplicated description of the common portions is omitted.

The environmental temperature for the DC-DC converter is easily variable depending on temperature variation in the location where the DC-DC converter is placed and upon thermal generation by individual circuit configuration components of the DC-DC converter. The variation in environmental temperature causes variations in characteristics of individual circuit configuration components of the DC-DC converter.

Particularly, for example, among circuits shown in FIG. 1, characteristics vary widely in the rectifying diode 14 of the secondary side circuit 5 and the rectifying diode 18 of the voltage-detecting circuit 8. For this reason, the output voltage $V_{out}$ of the secondary side circuit 5 and a rectified and smoothed voltage $V_c$ in a voltage-detecting coil N3 individually vary independently of each other according to the temperature variation. In particular, a forward voltage in the rectifying diode 14 varies so as to decrease by a voltage $\Delta V_{d14}$ according to a rise in environmental temperature, and the output voltage $V_{out}$ of the secondary side circuit 5 rises according to the amount of reduced variation. The output voltage of the secondary side circuit 5 after increased variation results in as $V_{out}+\Delta V_{d14}$.

Also, a forward voltage in the rectifying diode 18 of the voltage-detecting circuit 8 varies to decrease by a voltage $\Delta V_{d18}$ according to the temperature increase variation. After the increased variation, the rectified and smoothed voltage in the voltage-detecting coil N3 is forced to increase to $V_c+\Delta V_{d18}$ according to the amount of the above reduced variation.

Unless countermeasures are taken for the temperature-variation-attributed variation of the output voltage $V_{out}$ of the secondary side circuit 5, the control circuit 10 controls on/off operations of the switching device Q so as to compensate for the variation amount $\Delta V_{d18}$ of the rectified and smoothed voltage in the aforementioned voltage-detecting coil N3. For this reason, according to the control operation of the control circuit 10, the output voltage $V_{out}$ of the secondary side circuit 5 varies by the amount corresponding to the aforementioned voltage variation amount $\Delta V_{d18}$ (in particular, by the voltage variation amount $\Delta V_{d18}$ (N2/N3)) when the number of windings of the secondary coil N2 is represented by N2, and the number of windings of the voltage-detecting coil N3 is represented by N3).

Therefore, the variation of the forward voltage in the rectifying diodes 14 and 18 according to the environmental temperature variation causes a variation of the output voltage $V_{out}$ of the secondary side circuit 5 by a voltage variation amount $\Delta V \cdot (\Delta V = \Delta V_{d14} - \Delta V_{d18} \cdot (N2/N3))$ Then, in the second embodiment, means for reducing the aforementioned voltage variation amount $\Delta V$ so as to be zero are provided, a description will be given of configurations that can suppress the aforementioned variation of the output voltage $V_{out}$, which is attributed to the environmental temperature variation.

The means for reducing the aforementioned voltage variation amount $\Delta V$ so as to be zeroed, which is attributed to the aforementioned environmental temperature variation, differ depending upon the circuit constant conditions as described below. The circuit constant conditions include, for example, the forward voltage variation amount $\Delta V_{d14}$ of the rectifying diode 14, the forward voltage variation amount $\Delta V_{d18}$ of the rectifying diode 18, the number of windings N2 of the secondary coil N2, and the number of windings N3 of the voltage-detecting coil N3.

Figure 6A:
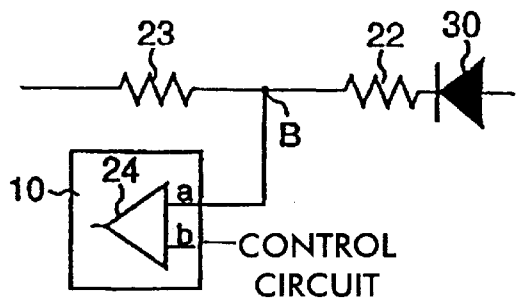
FIGS. 6A and 6B are circuit diagrams of example temperature-compensating circuits employed in a DC-DC converter according to a second embodiment of the present invention.

First, a description will be given of a case where the aforementioned variation amount $\Delta V_{d14}$ is larger than the variation amount $\Delta V_{d18}$ ($\Delta V_{d14} > \Delta V_{d18}$), and the number of windings N2 of the secondary coil N2 is equal to the number of windings N3 of the voltage-detecting coil N3 (N2=N3). In this case, as shown in FIG. 6A, a temperature-compensating diode 30 is connected serially to the resistor 22. At this time, a cathode side of the temperature-compensating diode 30 is directed to oppose a connection point "B" (hereinafter, referred to as "control-voltage input point "B"") of the resistor 22, a resistor 23, and the input terminal "a" of the control circuit 10.

Similarly to the aforementioned rectifying diodes 14 and 18, with the aforementioned temperature-compensating diode 30, a forward voltage varies by a voltage variation amount $\Delta V_{d30}$ according to a temperature variation. For this reason, with the temperature-compensating diode 30, the temperature-variation-attributed variation amount $\Delta V$ of the output voltage $V_{out}$ of the secondary side circuit 5 is $(\Delta V_{d14} - (\Delta V_{d18} + \Delta V_{d30}) \cdot (N2/N3))$. In this case, the number of windings N2 of the secondary coil N2 is equal to the number of windings N3 of the voltage-detecting coil N3 (N2=N3). Accordingly, to compensate for (to zero) the variation amount $\Delta V$ of the aforementioned output voltage $V_{out}$, a diode to be employed as the temperature-compensating diode 30 must have characteristics to satisfy the conditions of expression (5) indicated below.

$$\Delta V_{d30} = \Delta V_{d14} - \Delta V_{d18} \tag{5}$$

As described above, a temperature-compensating circuit is comprised of the temperature-compensating diode 30. This temperature-compensating circuit adds the aforementioned voltage $\Delta V_{d30}$ to an output voltage of the voltage-detecting circuit 8, in which the voltage $\Delta V_{d30}$ is to offset the amount of temperature-variation-attributed variation of the output voltage $V_{out}$. Accordingly, a temperature-compensating voltage is applied to the control circuit 10.

According to circuit operation of the temperature-compensating circuit and the control circuit 10, the temperature-variation-attributed variation of the output voltage $V_{out}$ of the secondary side circuit 5 can be compensated for with high precision, and temperature-variation-attributed variation of the output voltage $V_{out}$ of the secondary side circuit 5 can be suppressed. By this, temperature compensation is carried out to allow better stabilization of the output voltage $V_{out}$ to be achieved.

Figure 6B:
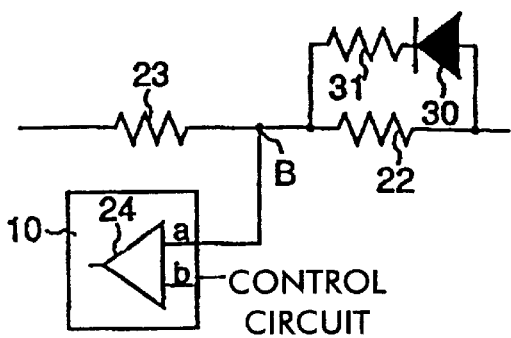

Instead of serial connection of the aforementioned temperature-compensating diode 30 to the resistor 22, as shown in FIG. 6B, a serially connected structure of the temperature-compensating diode 30 and a resistor 31 may be connected parallel thereto. In this case also, the cathode side of the aforementioned temperature-compensating diode 30 is directed to oppose the aforementioned control-voltage input "B". The aforementioned temperature-compensating diode 30 and resistor 31 constitute the temperature-compensating circuit. In this case also, the temperature-variation-attributed variation of the output voltage $V_{out}$ can be suppressed, similarly to the case where the temperature-compensating diode 30 is connected serially to the resistor 22, and temperature compensation is carried out to allow better stabilization of the output voltage $V_{out}$ to be achieved.

Next, a description will be given of a case where the aforementioned variation amount $\Delta V_{d14}$ is larger than the variation amount $\Delta V_{d18}$ ($\Delta V_{d14} > \Delta V_{d18}$), and the number of windings N2 of the secondary coil N2 is smaller than the number of windings N3 of the voltage-detecting coil N3 (N2<N3). In this case also, as shown in FIG. 6A, the temperature-compensating diode 30 is connected serially to the resistor 22; alternatively, as shown in FIG. 6B, a serially connected structure of the temperature-compensating diode 30 and the resistor 31 is connected parallel to the resistor 22.

In addition, a description will be given of a case where the aforementioned variation amount $\Delta V_{d14}$ is larger than the variation amount $\Delta V_{d18}$ ($\Delta V_{d14} > \Delta V_{d18}$), and at least one of the number of windings of the secondary coil N2 and the number of windings of the voltage-detecting coil N3 can be selectively determined. In this case, the number of windings N2 of the secondary coil N2 is arranged so as to be larger than the number of windings N3 of the voltage-detecting coil N3 (N2>N3). Preferably, the individual numbers of windings N2 and N3 of the secondary coil N2 and the voltage-detecting coil N3 are determined so as to satisfy expression (6) indicated below.

$$(N2/N3) = (\Delta V_{d14} / \Delta V_{d18}) \tag{6}$$

In this case, even without the temperature-compensating circuit as described above being provided, the temperature-variation-attributed variation of the output voltage $V_{out}$ of the secondary side circuit 5 can be suppressed. This does not require components to be dedicated to the temperature compensation, allowing prevention of increase in the number of circuit components.

Also, a description will be given of a case where the aforementioned variation amount $\Delta V_{d14}$ is smaller than the variation amount $\Delta V_{d18}$ ($\Delta V_{d14} < \Delta V_{d18}$), and at least one of the number of windings of the secondary coil N2 and the number of windings of the voltage-detecting coil N3 can be selectively determined. In this case, the number of windings N2 of the secondary coil N2 is arranged so as to be smaller than the number of windings N3 of the voltage-detecting coil N3 (N2<N3). Preferably, the individual numbers of windings N2 and N3 of the secondary coil N2 and the voltage-detecting coil N3 are determined so as to satisfy the expression (6) indicated above. In this case also, even without the temperature-compensating circuit as described above being provided, the temperature-variation-attributed variation of the output voltage $V_{out}$ of the secondary side circuit 5 can be suppressed, and thereby, increase in the number of circuit components can be prevented.

Figure 7A:
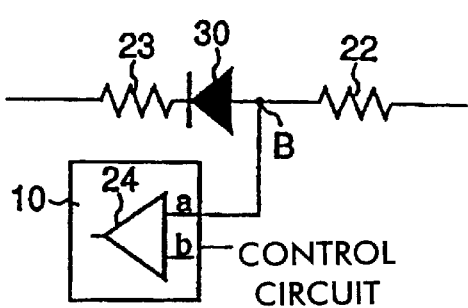
FIGS. 7A and 7B are other circuit diagrams of example temperature-compensating circuits employed in a DC-DC converter according to a second embodiment of the present invention.
Figure 7B:
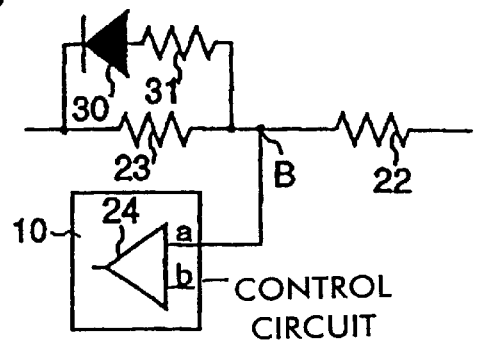

Also, a description will be given of a case where are determined conditions in which the aforementioned variation amount $\Delta V_{d14}$ is smaller than the variation amount $\Delta V_{d18}$ ($\Delta V_{d14} < \Delta V_{d18}$), and the number of windings of the secondary coil N2 is equal to or larger than the number of windings of the voltage-detecting coil N3 (N2≧N3). In this case, as shown in FIG. 7A, the temperature-compensating diode 30 is connected serially to the resistor 23, or as shown in FIG. 7B, a serially connected structure of the temperature-compensating diode 30 and the resistor 31 is connected parallel to the resistor 23. In this case, an anode side of the temperature-compensating diode 30 is directed to oppose the aforementioned control-voltage input "B".

As a matter of course, in the above case also, according to the circuit operation of the temperature-compensating diode 30 and the control circuit 10, the temperature-variation-attributed variation of the output voltage $V_{out}$ can be suppressed, similarly to the case where the temperature-compensating diode 30 as shown in FIGS. 6A and 6B is provided. Temperature compensation is thereby carried out to allow stabilization of the output voltage $V_{out}$ to be achieved.

Also, a description will be given of a case where the aforementioned variation amount $\Delta V_{d14}$ is equal to the variation amount $\Delta V_{d18}$ ($\Delta V_{d14} = \Delta V_{d18}$), and at least one of the number of windings of the secondary coil N2 and the number of windings of the voltage-detecting coil N3 can be selectively determined. In this case, the number of windings N2 of the secondary coil N2 is arranged so as to be the same as the number of windings N3 of the voltage-detecting coil N3 (N2=N3). In this way, by merely arranging the individual numbers of windings N2 and N3 of the secondary coil N2 and the voltage-detecting coil N3 so as to be the same, the aforementioned temperature-variation-attributed variation amount $\Delta V$ ($\Delta V = \Delta V_{d14} - \Delta V_{d18}$). (N2/N3)) is zeroed (compensated for). Accordingly, a voltage compensating for the temperature variation can be outputted from the secondary side circuit 5. In this case also, even without the temperature-compensating circuit as described above being provided, temperature compensation is carried out, and stabilization of the output voltage $V_{out}$ of the secondary side circuit 5 can be achieved, thereby allowing prevention of the increase in the number of components.

Also, a description will be given of a case where are determined conditions in which the aforementioned variation amount $\Delta V_{d14}$ is equal to the variation amount $\Delta V_{d18}$ ($\Delta V_{d14} = \Delta V_{d18}$), and the number of windings of the secondary coil N2 is larger than the number of windings of the voltage-detecting coil N3 (N2>N3). In this case, as shown in FIG. 7A, the temperature-compensating diode 30 is connected serially to the resistor 23. Alternatively, as shown in FIG. 7B, the serially connected structure of the temperature-compensating diode 30 and the resistor 31 is connected parallel to the resistor 23. As described earlier, the configuration of this type allows compensation for the temperature variation so as to stabilize the output voltage $V_{out}$ of the secondary side circuit 5.

Also, a description will be given of a case where are determined conditions in which the aforementioned variation amount $\Delta V_{d14}$ is equal to the variation amount $\Delta V_{d18}$ ($\Delta V_{d14} = \Delta V_{d18}$), and the number of windings of the secondary coil N2 is smaller than the number of windings of the voltage-detecting coil N3 (N2<N3). In this case, as shown in FIG. 6A, the temperature-compensating diode 30 is connected serially to the resistor 22. Alternatively, as shown in FIG. 6B, the serially connected structure of the temperature-compensating diode 30 and the resistor 31 is connected parallel to the resistor 22. As described earlier, a configuration of this type allows compensation for temperature variation so as to stabilize the output voltage $V_{out}$ of the secondary side circuit 5.

As described above, the second embodiment is provided with the means for offsetting the amount of temperature-variation-attributed variation according to the circuit-constant conditions which include predetermined factors, such as the aforementioned variation amount $\Delta V_{d14}$, variation amount $\Delta V_{d18}$, number of windings N2 of the secondary coil N2, and number of windings N3 of the voltage-detecting coil N3. This allows prevention of problems in which the output voltage $V_{out}$ of the secondary side circuit 5 varies according to the temperature variation.

The second embodiment also has the configuration that characterizes the first embodiment; that is, the configuration that performs highly-precise compensation for the load-variation-attributed variation of the output voltage $V_{out}$ of the secondary side circuit 5. Accordingly, the load-variation-attributed variation of the output voltage $V_{out}$ can be compensated for with high precision, and in addition, the temperature-variation-attributed variation of the output voltage $V_{out}$ can be suppressed. From the above, the configuration shown in the second embodiment allows significant improvement in stability of the output voltage $V_{out}$ of the secondary side circuit 5.

As a matter of course, as in the case where the DC-DC converter is placed in an environment where the temperature is controlled with high precision, there is a case where temperature-variation-attributed variations of the output voltage $V_{out}$ are minor problems. In this case, although the means for temperature compensation are not provided, that is, even with the configuration shown in the aforementioned first embodiment, the output voltage $V_{out}$ of the secondary side circuit 5 can be stabilized with significantly higher precision.

Figure 8:
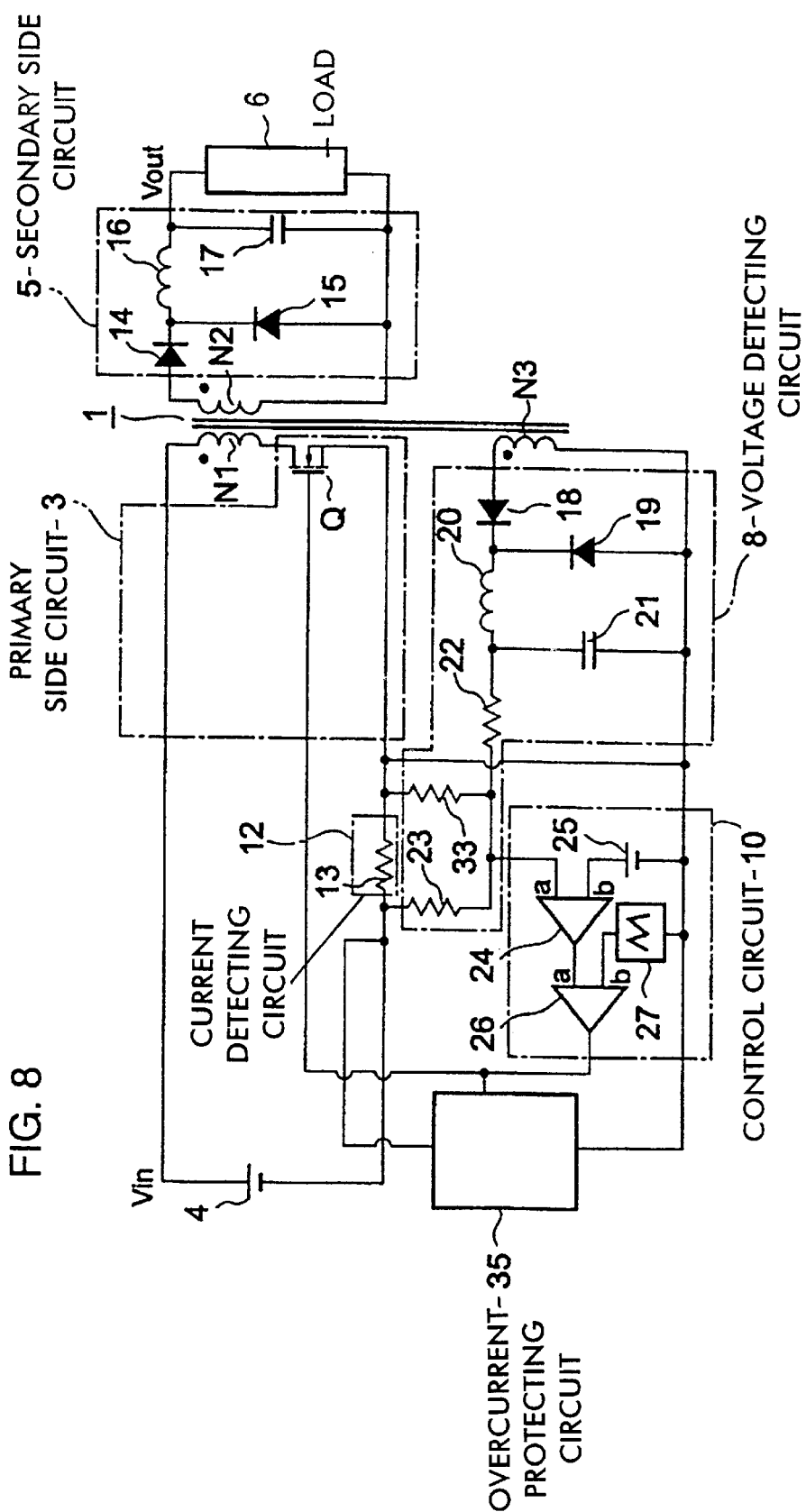
FIG. 8 is a circuit diagram of a DC-DC converter according to a third embodiment of the present invention.

Hereinbelow, a third embodiment is described. The third embodiment is characterized, as shown in FIG. 8, by having an overcurrent-protecting circuit 35. Except for the above, the configuration is substantially the same as those of the individual embodiments described above; therefore, in the third embodiment, the same symbols or numbers are used for portions identical to those of the individual embodiments described above, and duplicated description of the common portions is omitted.

As described above, in the third embodiment, the overcurrent-protecting circuit 35 is provided. The overcurrent-protecting circuit 35 has a configuration for performing predetermined overcurrent-protecting operations according to a working current in the primary side circuit 3, which has been detected by the primary side current-detecting circuit 12. For example, when the overcurrent-protecting circuit 35 has sensed an overcurrent condition of a circuit according to a working current in the primary side circuit 3, which has been detected by the aforementioned primary side current-detecting circuit 12, it functions to significantly reduce the pulse width of pulse control signals to be applied to the switching device Q. This significantly shortens the on-time of the switching device Q, thereby allowing the aforementioned overcurrent-protecting condition to be normalized.

A voltage-detecting circuit 8 shown in FIG. 8 has a resistor 33, which differs from the voltage-detecting circuit 8 shown in FIG. 1. With the voltage-detecting circuit 8 having the resistor 33, as shown in FIG. 8, a voltage in the smoothing capacitor 21 is divided by the resistors 22, 23, and 33, and a divisional voltage is outputted to the control circuit 10.

According to the third embodiment, since the overcurrent-protecting circuit 35 is provided, when a circuit is in an overcurrent condition, the overcurrent-protecting circuit 35 immediately functions so as to normalize the overcurrent condition. This allows prevention of problems causing damage to circuit configuration components, and the like, which are attributable to continuation of the overcurrent condition.

Also, using a working current in the primary side circuit 3, which has been detected by the primary side current-detect circuit 12, the third embodiment performs circuiting operations to suppress the aforementioned load-variation-attributed variation of the output voltage $V_{out}$, and concurrently, the aforementioned overcurrent-protecting operations. For this reason, a circuit for detecting a current required for overcurrent-protecting operations need not be provided independently of the primary side current-detecting circuit 12, by which the circuit can be prevented from being complicated, and the apparatus can be prevented from being larger. Also, increase in power loss can be minimized, thereby allowing prevention of circuit efficiency from being lowered.

The present invention is not restricted to the embodiments described above, and it can be embodied in various other ways. For example, in the above individual embodiments, the primary side current-detecting circuit is comprised of the resistor 13. However, the resistor 13 may be replaced by a current transformer, i.e., the primary side current-detecting circuit may be configured as a current transformer. In this case, a configuration may be one in which a working current in the primary side circuit 3 is converted by the current transformer to a voltage so as to be detected, and the detected voltage superposes with the rectified and smoothed voltage $V_c$ of the aforementioned voltage-detecting coil N3. In this configuration, with the overcurrent-protecting circuit, as shown in the third embodiment, being provided, the overcurrent-protecting circuit performs overcurrent-protecting operations according to the working current in the primary side circuit 3, which has been detected by the aforementioned current transformer.

Also, in order to compensate for the light load-attributed variation of the output voltage $V_{out}$, the above individual embodiments have a configuration in which the off-time $T_{off}$ of the switching device Q is equivalent at least to the half-cycle $T_r$ of the LC resonance in the primary side circuit 3. However, when the variation of the output voltage $V_{out}$ during the aforementioned light load application can be foreseen to be a minor problem, a configuration may be such that the off-time $T_{off}$ of the switching device Q is shorter than the half-cycle $T_r$ of the LC resonance in the primary side circuit 3.

Also, the second embodiment has all the configurations: the primary side current-detecting circuit 12 that performs highly-precise compensation for the load-variation-attributed variation of the output voltage $V_{out}$ of the secondary side circuit 5; the configuration that performs highly-precise compensation for the light load-attributed variation of the output voltage $V_{out}$ of the secondary side circuit 5 (that is, the configuration in which the off-time $T_{off}$ of the switching device Q is equivalent at least to the half-cycle $T_r$ of the LC resonance in the primary side circuit 3); and the configuration that performs the temperature compensation. However, for example, when the load 6 to be connected to the secondary side circuit 5 does not cause a load variation, the problem of the load-variation-attributed variation of the output voltage $V_{out}$ of the secondary side circuit 5 does not occur. In this case, as shown in FIG. 9, the primary side current-detecting circuit 12, as shown in the first embodiment, need not be provided.

Figure 9:
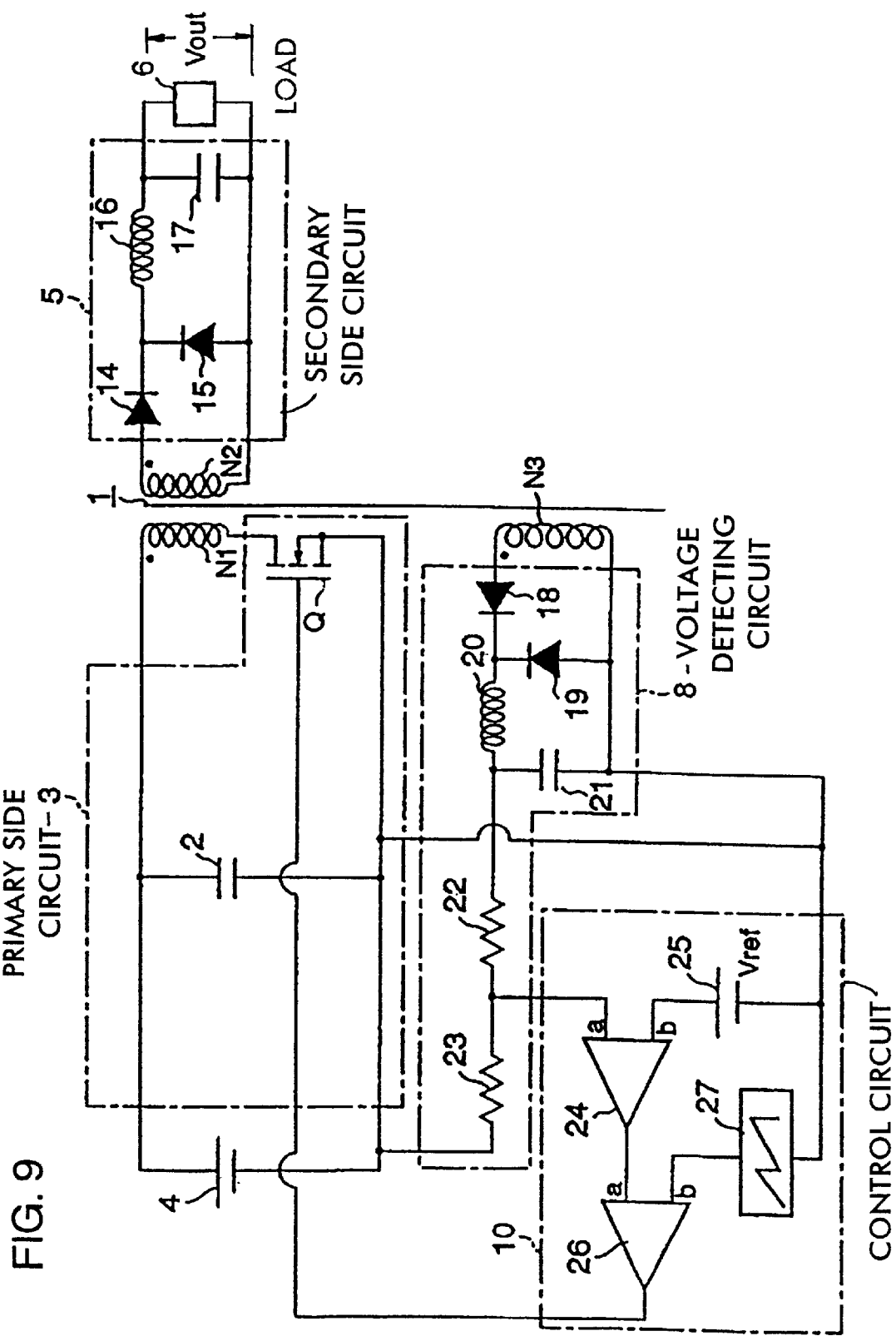
FIG. 9 is a circuit diagram of a DC-DC converter according to a variation of the embodiments of the present invention.

As a modification example, a circuit of the DC-DC converter, as shown in FIG. 9, may have the configuration for performing highly-precise compensation for the light load-attributed variation of the output voltage $V_{out}$ of the secondary side circuit 5 (that is, the configuration in which the off-time $T_{off}$ of the switching device Q is equivalent at least to the half-cycle $T_r$ of the LC resonance in the primary side circuit 3); and the configuration for performing the temperature compensation, as shown in the second embodiment.

Also, there is a case where either the load-variation-attributed variation of the output voltage $V_{out}$ of the secondary side circuit 5 or the light load-attributed variation of the output voltage $V_{out}$ of the secondary side circuit 5 is a minor problem. In this case, as a modification, the circuit of the DC-DC converter, as shown in FIG. 9, in which either the aforementioned primary side current-detecting circuit 12 or the configuration for solving the light load-attributed problem is not provided, may have the configuration for performing the temperature compensation, as shown in the second embodiment.

Figure 10:
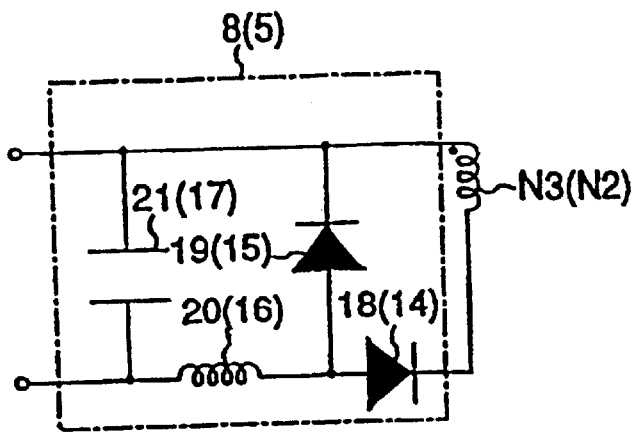
FIG. 10 is a circuit diagram showing another example circuit for rectifying and smoothing a voltage.

Also, in the above individual embodiments, the circuits 5 and 8 for rectifying and smoothing voltage are configured as shown in FIG. 1. However, there are no restrictions thereto, and as long as the configuration can rectify and smooth the voltage in the coils N2 and N3, the circuits 5 and 8 may be of a circuit configuration as shown, for example, in FIG. 10. Also, instead of the rectifying diodes 14, 15, 18, and 19, synchronous rectifiers, such as MOS-FETs, may be provided.

Also, configuration of the control circuit 10 is not restricted to that as shown in FIG. 1, and it may be different as long as it has a configuration that applies pulse control signals for stabilizing the output voltage $V_{out}$ of the secondary side circuit 5 to the switching device Q according to a voltage outputted from the voltage-detecting circuit 8

Also, the above individual embodiments have been described referring to a forward converter as an example. However, the present invention may be applied to flyback converters. Furthermore, the present invention may be applied to AC-DC converters, in addition to DC-DC converters.

According to the present invention, the primary side current-detecting circuit is provided, a working current in the secondary side circuit which corresponds to a working current in the secondary side circuit is converted by the primary side current-detecting circuit and detected, and the detected voltage superposes with an output voltage of a voltage-detecting circuit. Since a configuration such as that described above is provided, a voltage to be applied to a control circuit from the voltage-detecting circuit varies according to a load-variation-attributed variation of an output voltage of the secondary side circuit. Therefore, circuit operation of the control circuit functions to compensate for the load-variation-attributed variation of the output voltage. Accordingly, even in a configuration that employs a method in which a voltage-detecting coil of a transformer is used to indirectly detect an output voltage of the secondary side circuit, the stabilization of the output voltage can be achieved, and stability of the output voltage can be improved without being affected by adverse effects due to the load variation.

With the control circuit having the configuration in which the pulse control signal having the off-time $T_{off}$ of the switching device Q which is equivalent to at least the half-cycle $T_r$ of the LC resonance in the primary side circuit 3, during a light load time when the discontinuous voltage is flowing to the choke coil of the secondary side circuit, a voltage in a waveform unique to the light load time can be generated in the voltage-detecting coil. This voltage in the voltage-detecting coil is rectified and smoothed, and a voltage corresponding to the rectified and smoothed voltage is applied to the control circuit. Therefore, the output voltage of the secondary side circuit is controlled so as to be stabilized through circuit operations of the control circuit, which are performed in accordance with a voltage corresponding to the voltage in the voltage-detecting coil. In this way, the variation of the output voltage in the secondary side circuit can be suppressed during the light load time.

In the configuration having the temperature-compensating circuit, a voltage for compensating the amount of temperature-variation-attributed variation of the output voltage of the secondary side circuit is added to the output voltage of the voltage-detecting circuit, whereby a voltage for performing temperature compensation is applied to the control circuit. That is, the voltage applied to the control circuit from the voltage-detecting circuit side varies according to the temperature-variation-attributed variation of the output voltage of the secondary side circuit. Therefore, the circuit operation of the control circuit functions to allow suppression of the temperature-variation-attributed variation of the output voltage of the secondary side circuit.

In the configuration in which the number of windings N2 of the secondary coil N2 is equal to the number of windings N3 of the voltage-detecting coil N3, the same voltage as the voltage occurring in the secondary coil is generated in the voltage-detecting coil. Accordingly, when the amount of temperature-variation-attributed variation of the output voltage of the secondary side circuit is the same as the amount of temperature-variation-attributed variation of the output voltage of the voltage-detecting circuit, by merely arranging the number of windings of the secondary coil so as to be the same as the number of windings of the voltage-detecting coil, the temperature-variation-attributed variation of the output voltage of the secondary side circuit can be suppressed. That is, even without components to be dedicated to temperature compensation being provided, temperature compensation for the output voltage can be implemented. Accordingly, without increase in the number of components, the temperature-variation-attributed variation of the output voltage of the secondary side circuit can be suppressed.

In the configuration in which the overcurrent-protecting circuit is provided, when a circuit is in an overcurrent condition, the overcurrent condition can be normalized immediately by the overcurrent-protecting operation of the overcurrent-protecting circuit. This allows prevention of problems causing damage to circuit configuration components, and the like, which are attributable to the overcurrent condition. Also, in the present invention, according to a working voltage in the primary side circuit which has been detected by primary side current-detecting circuit, both the aforementioned circuit operation for suppressing the aforementioned load-variation-attributed variation and the aforementioned overcurrent-protecting operation can be performed. For this reason, a circuit for detecting a current required for overcurrent-protecting operations need not be provided independently of the primary side current-detecting circuit, by which the circuit can be prevented from being complicated, and the apparatus can be prevented from being larger. Also, increase in power loss can be minimized, thereby allowing prevention of circuit efficiency from being lowered.

In the configuration in which the primary side current-detecting circuit is comprised of the resistor, the number of components can be prevented from being increased, and in addition, the apparatus can be prevented from being larger, and prominent advantages can be produced.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed is:

1. A DC-DC converter comprising:
    a transformer having a primary coil, a secondary coil and a voltage detecting coil;
    a primary side circuit including a switching device performing on/off operations to output energy in the primary coil of the transformer to the secondary coil;
    a secondary side circuit for rectifying and smoothing a voltage provided from the secondary coil so as to output a DC-DC output voltage which is applied to a load;
    a primary side current-detecting circuit converting a reflected load current in the primary side circuit into a reflected load voltage, the reflected load current corresponding to a load current flowing through the load;
    a voltage detecting circuit for rectifying and smoothing a voltage output from the voltage-detecting coil so as to generate a detected voltage corresponding to a desired voltage to be applied to the load, the voltage-detecting circuit subtracting the reflected load voltage from the detected voltage to provide a difference voltage which compensates for variations in an output voltage across the load which are attributed to variations in the load current and generating a control signal as a function of the difference voltage;
    a control circuit applying a pulse control signal to the switching device, the pulse control signal controlling on/off operation of the switching device as a function of the control signal; and
    further comprising a temperature-compensating circuit for adding to the detected voltage a voltage for offsetting variations in the load voltage due to temperature variations.

2. The DC-DC converter of claim 1, farther comprising an overcurrent-protecting circuit for performing an overcurrent-protecting operation according to the reflected load current.

3. The DC-DC converter of claim 1, further comprising an overcurrent-protecting circuit for performing an overcurrent-protecting operation according to the reflected load current.

4. The DC-DC converter of claim 1, wherein the control circuit applies a pulse control signal having an off-time $T_{off}$ which is equivalent to at least a half-cycle $T_r$ of an LC resonance in the primary side circuit to the switching device.

5. The DC-DC converter of claim 1, wherein a number of windings of the secondary coil of the transformer is the same as a number of windings of the voltage-detecting coil.

6. The DC-DC converter of claim 1, wherein the primary side current-detecting circuit comprises a resistor through which the reflected load current flows.

7. The DC-DC converter of claim 2, wherein the control circuit applies a pulse control signal having an off-time $T_{off}$ which is equivalent to at least a half-cycle $T_r$ of an LC resonance in the primary side circuit to the switching device.

8. The DC-DC converter of claim 2, wherein a number of windings of the secondary coil of the transformer is the same as a number of windings of the voltage-detecting coil.

9. The DC-DC converter of claim 2, wherein the primary side current-detecting circuit comprises a resistor through which the reflected load current flows.

10. The DC-DC converter of claim 1, wherein the temperature-compensating circuit comprises a temperature compensation diode.

11. The DC-DC converter of claim 10, wherein the temperature compensation diode is provided between an output of the voltage-detecting circuit and an input to the control circuit.

12. The DC-DC converter of claim 10, wherein the temperature compensation circuit is provided between the input to the control circuit and the primary side current-detecting circuit.

13. The DC-DC converter of claim 11 wherein the temperature compensation diode is provided in series with a resistor coupling the voltage detecting circuit and the input to said control circuit.

14. The DC-DC converter of claim 11, wherein the temperature compensation diode is provided in parallel with a resistor coupling the voltage-detecting circuit and the input to said control circuit.

15. The DC-DC converter of claim 12, wherein the temperature compensation diode is provided in series with a resistor coupling the primary side current-detecting circuit and the input to said control circuit.

16. The DC-DC converter of claim 12, wherein the temperature compensation diode is provided in parallel with a resistor coupling the primary side current-detecting circuit and the input to said control circuit.

17. A DC-DC converter comprising:

a transformer having a primary coil, a secondary coil and a voltage detecting coil;

a primary side circuit including a switching device performing on/off operations to output energy in the primary coil of the transformer to the secondary coil;

a secondary side circuit for rectifying and smoothing a voltage provided from the secondary coil so as to output a DC-DC output voltage which is applied to a load;

a primary side current-detecting circuit converting a reflected load current in the primary side circuit into a reflected load voltage, the reflected load current corresponding to a load current flowing through the load;

a voltage detecting circuit for rectifying and smoothing a voltage output from the voltage-detecting coil so as to generate a detected voltage corresponding to a desired voltage to be applied to the load, the voltage-detecting circuit subtracting the reflected load voltage from the detected voltage to provide a difference voltage which compensates for variations in an output voltage across the load which are attributed to variations in the load current and generating a control signal as a function of the difference voltage; and a control circuit applying a pulse control signal to the switching device, the pulse control signal controlling on/off operation of the switching device as a function of the control signal.

18. A DC-DC converter comprising:

a transformer having a primary coil, a secondary coil and a voltage detecting coil;

a primary side circuit including a switching device performing on/off operations to output energy in the primary coil of the transformer to the secondary coil;

a secondary side circuit for rectifying and smoothing a voltage provided from the secondary coil so as to output a DC-DC output voltage which is applied to a load; and a control circuit applying a pulse control signal to the switching device, the pulse control signal controlling on/off operation of the switching device as a function of both a desired load voltage and a reflected current in the primary side circuit which is indicative of an actual load voltage across the load and varies along with said actual load voltage.

* * * * *